United States Patent Office 3,141,784
Patented July 21, 1964

3,141,784
HIGH TEMPERATURE REFRACTORY
Donald F. King and Ben Davies, Pittsburgh, Pa., assignors to Harbison-Walker Refractories Company, Pittsburgh, Pa., a corporation of Pennsylvania
No Drawing. Filed Mar. 21, 1963, Ser. No. 266,796
20 Claims. (Cl. 106—58)

This invention relates to basic refractories of high purity and controlled content of accessory oxides which exhibit physical and mechanical properties significantly improved as compared with bricks of similar basis but lacking the controlled composition of the invention.

Although not limited to such use, the refractories provided by this invention are especially adapted for use in connection with the production of steel by the modern oxygen blowing process, sometimes referred to as the LD process and, among terms, merely as oxygen steel making. In that process, briefly, the steel-making reactions are greatly accelerated by the introduction of gaseous oxygen, generally above the metal surface, within the vessel, or converter. A basic slag is used which necessitates the use of basic refractories. The consequence of oxygen blowing and a slag that, in the initial portion of the blow, is of relatively low basicity are that the refractory lining is subjected to unusually severe conditions, and as a result since the introduction of this method there has been continuous experimentation looking toward the development of better refractories.

Typically, the lining of an oxygen converter consists of an 18-inch thick layer of basic brick beginning at the hot face, backed by four to six inches of basic rammed lining, and between the rammed lining and the outer metal shell a 4.5 inch layer of basic brick.

The basic refractories commonly used are those consisting principally of dead burned magnesite (magnesia, MgO), or dead burned dolomite (CaO·MgO). Theoretically, lime alone (CaO) would be desirable because of its very high melting point. However, from the time when the use of lime as a refractory material was first proposed, many years ago, the tendency of burned lime to undergo hydration from atmospheric moisture has precluded its use, and dead burned dolomite likewise shows a pronounced hydration tendency. Attempts have been made to stabilize those materials against attack by moisture but, to date, true stabilization has not been achieved without serious impairment of refractoriness. Iron oxide ($Fe_2O_3$) has been widely used as a stabilizing additive, for instance on the order of 5 to 8 percent, by weight. Although the hydration tendency of burned lime and dolomite may be suppressed somewhat in that way, the reaction of lime and iron oxide results in the formation of $2CaO·Fe_2O_3$ which melts at the relatively low temperature of 2650° F. compared with the melting point of pure lime of 4675° F. A 5 percent addition of iron oxide will result in the development of more than 8.5 percent of softening liquid produced by the said reaction and, thus, render the brick unacceptable for very high temperature use.

Calcined lime and dolomite, in the absence of stabilizing agents, do not have the high density and concomitantly low porosity desired for refractory use. Iron oxide advantageously improves density but its presence has, for the reason just noted, a seriously adverse effect upon refractoriness.

Although developments in the refractory trade have been sufficient to assure the success of the oxygen steel making process, the refractories available for lining the converter have not afforded satisfactory high life. Generally, lining life is measured in terms of the number of heats, or the total tonnage of steel produced, before relining becomes necessary. With the refractories previously available a vessel making 80 tons per heat will at most complete 200 heats and, normally, substantially fewer, before relining; whereas, for maximum economy and continuity of operation, a substantially greater number of heats would be desirable. For example, in a two-furnace steel plant where one vessel is continuously in use while the other is being prepared for use by relining, if there is any appreciable speed-up in the blowing rate, it becomes a real problem to complete the relining of the second vessel in time to have it available when needed as a consequence of the relatively short life of the previously available refractories.

It is among the objects of this invention to provide refractories comprising lime and magnesia having physical properties adapting them for use generally at very high temperatures, for instance as rotary kiln linings, which are much superior in performance as linings for oxygen steel vessels as compared with the linings previously available, and which are readily prepared by conventional refractory making procedures.

A further object is to provide refractories in accordance with the foregoing object that are adequately hydration resistant.

Other objects will appear from the following specification.

The refractories provided by this invention, whether in the form of shapes or as ramming or monolithic materials, and which are especially adapted for use in the oxygen steel making process, comprise, by weight, at least 96 percent of MgO-plus-CaO, the MgO ranging from 50 to 95 percent and the CaO from 50 to 5 percent, and there being present, as a critical limitation, no more than about 4 percent total $SiO_2$, $Al_2O_3$ and $Fe_2O_3$ referred to sometimes hereinafter for brevity as SAF. For use in the oxygen steel process the brick must also contain residual carbon. For all purposes we prefer at least 97 percent of CaO-plus-MgO and less than 3 percent of SAF.

In view of the virtual exclusion of impurities (SAF), including the iron oxide that has previously been used to combat the hydration tendency of lime, reliance must be placed on other means of counteracting hydration characteristics. This may be accomplished, for example, in the manner disclosed and claimed in application Serial No. 808,014, filed April 22, 1959 (now United States Patent No. 2,971,240), by Albert L. Renkey and assigned to the present assignee. In accordance with that invention refractory shapes containing free lime as a substantial refractory constituent are rendered resistant to hydration by subjecting the shapes to a flash firing in which the unburned shapes made from dead burned refractory material are almost instantaneously raised to a high temperature, e.g. at least about 1000° F. in not more than 5 minutes, and preferably to about 1500° F. in not more than about 15 minutes. Thereafter, burning is completed at a temperature of, say, 2500° F. to 3000° F. but the rate is not critical. Thereafter the burned brick may be cooled, the rate of cooling being not critical. Another way of counteracting the hydration characteristics of refractories containing substantial proportions of burned lime is disclosed and claimed in application Serial No. 7767, filed February 10, 1960, by Earl Leatham and Albert H. Pack, likewise assigned to the owner of the present application. This application of Leatham et al. was abandoned in favor of application, Serial No. 40,181, filed July 1, 1960, now United States Patent No. 3,060,042. In the latter case, calcined dolomite or calcined lime, or mixtures of them, are rendered resistant to hydration and of density approaching maximum by initially calcining them to not over about 2 percent, preferably not over about 1 percent, of ignition loss, for instance at, say 1600° to 2200° F. After crushing and grain sizing, in accordance with desired or standard practices, they are dry pressed, suitably by briquetting rolls, under extremely high pressure, at least about 20,000 p.s.i., and preferably higher, to produce small briquettes. The briquettes, still without the addition of water or other liquids, and then dead burned at temperatures over about 3400° F., which converts them to a form that is resistant to hydration for substantial periods of time. They may then be crushed and used for the production of refractory shapes.

Lime processed in the manner disclosed in the aforesaid application Serial No. 7767 will yield dead burned grain of about 3.10 bulk specific gravity as compared with 3.34 theoretical, while dolomite treated in the same manner produces dead burned grain of 3.25 bulk specific gravity as compared with theory of 3.46.

As illustrative of the advantages to be derived from the present invention, reference may be made to the following examples in which the lime or dolomite used were burned in the above described manner.

EXAMPLE I

High purity dolomite and magnesia of the following compositions

|  | Dolomite, percent | Magnesia, percent |
|---|---|---|
| Lime (CaO) | 57.75 | 1.5 |
| Magnesia (MgO) | 41.74 | 94.8 |
| Silica ($SiO_2$) | 0.14 | 2.8 |
| Iron Oxide ($Fe_2O_3$) | 0.09 | 0.6 |
| Alumina ($Al_2O_3$) | 0.25 | 0.3 | in the dead burned condition were crushed and sized in accordance with standard refractory practice and combined together to give a 60:40 mix by weight. The sized material was heated to about 230° F. and about 2.5 percent by weight of melted paraffin was added and thoroughly blended in. The mix was then pressed into brick at about 8000 p.s.i. The brick were placed in a kiln and the temperature raised rapidly to about 2700° F. as disclosed in the aforesaid application Serial No. 808,014 and held for five hours. This method of firing was also used in the following examples.

EXAMPLE II

Ninety parts by weight of high purity magnesia and ten parts by weight of high purity lime of the following compositions

|  | Magnesia, percent | Lime, percent |
|---|---|---|
| Lime (CaO) | 1.4 | 96.3 |
| Magnesia (MgO) | 96.1 | 0.9 |
| Silica ($SiO_2$) | 1.6 | 1.6 |
| Iron Oxide ($Fe_2O_3$) | 0.6 | 0.8 |
| Alumina ($Al_2O_3$) | 0.3 | 0.3 | on the ignition free basis were mixed together as the refractory batch. Brick were then prepared therefrom in the same manner as set forth in Example I.

EXAMPLE III

A refractory batch was made up of high purity hydrated lime, caustic magnesia and iron oxide of the following composition:

| | Parts |
|---|---|
| Hydrated lime | 100 |
| Caustic magnesia | 2 |
| Iron oxide ($Fe_2O_3$) | 5 |

This batch was burned to a calcine of 3.00 bulk specific gravity, from which brick were made as described in Example I.

EXAMPLE IV

This involved a batch of, by weight:

| | Parts |
|---|---|
| Calcined lime | 85 |
| Calcined Georgia kaolin | 15 |

A calcine with a bulk specific gravity of 2.92 was prepared and brick were made in accordance with the preceding examples except that the top firing temperature was 2600° F. The kaolin was an airfloated grade substantially all of which was finer than 100 Tyler mesh of typical analysis

| | Percent |
|---|---|
| Silica ($SiO_2$) | 55.3 |
| Alumina ($Al_2O_3$) | 40.7 |
| Titania ($TiO_2$) | 1.7 |
| Iron oxide ($Fe_2O_3$) | 1.4 |
| Lime (CaO) | 0.2 |
| Magnesia (MgO) | 0.2 |
| Alkalies ($Na_2O$, $K_2O$, $Li_2O$) | 0.3 |

EXAMPLE V

In this example, briquettes of high purity dolomite with 5 percent of $Fe_2O_3$ (for stabilization against hydration) were made following the usual commercial practices in preparing dead burned dolomite. These briquettes were crushed, graded, and made into brick as described above.

The following table records the properties and chemical compositions of the bricks of Examples I to V in which Example VI is a typical commercially available burned dolomite brick.

Table I

| Example | I | II | III | IV | V | VI |
|---|---|---|---|---|---|---|
| Weight, p.c.f. | 166 | 175 | 166 | 170 | 175 | 174 |
| Modulus of Rupture, p.s.i. | 2,100 | 2,700 | 1,830 | 2,500 | 3,680 | 2,800 |
| Linear Change in Burning___percent | −1.9 | −0.8 | −1.5 | −5.1 | 3.4 | |
| Reheat to 3,000° F., Linear Change, percent | −0.7 | −0.5 | −1.2 | (²) | −0.8 | −1.0 |
| Volume Change, percent | −1.8 | −1.0 | −3.1 | | −8.4 | −4.3 |
| Panel Spalling Test (3,000° F., Preheat Weight Loss), percent | 0.0 | 0.0 | 13 | | | |
| Hot Load Test, at 25 p.s.i., Temperature of Failure °F. | 3,150 | 3,100 | 2,610 | | 2,560 | 2,995 |
| Chemcial Analysis (Ignition Free Basis): | | | | | | |
| Lime (CaO)_____percent | 35.4 | 10.8 | 91.00 | 82.04 | 54.80 | 55.00 |
| Magnesia (MgO)_____do___ | 63.0 | 86.6 | 2.05 | .81 | 39.70 | 37.20 |
| Alumina ($Al_2O_3$)_____do___ | 0.2 | 0.3 | .25 | 6.31 | .29 | 2.00 |
| Silica ($SiO_2$)_____do___ | 1.2 | 1.6 | 1.60 | 9.70 | .23 | 3.60 |
| Iron Oxide ($Fe_2O_3$)_____do___ | 0.4 | 0.6 | 5.10 | .43 | 4.77 | 1.70 |
| Lime and Magnesia_____do___ | 98.4 | 97.4 | 93.05 | 82.85 | 94.50 | 92.20 |
| SAF ¹_____do___ | 1.8 | 2.5 | 6.95 | 16.44 | 5.29 | 7.30 |

¹ $SiO_2+Al_2O_3+Fe_2O_3$.
² Slumped at 2,700° F.

As will be observed from the foregoing table, brick in accordance with the present invention (Examples I and II) showed definitely superior properties to the others, in which the limitations upon lime-plus-magnesia and total of silica, alumina and iron oxide are not observed. The marked decrease in refractoriness of the bodies containing "stabilizing" agents can be recognized in the much higher shrinkage in burning (Examples III to V), in the continued marked shrinkage in the 3000° F. reheat test (Examples III to VI) and in the lower temperature of failure in the hot load test (Examples III, V and VI), all as compared with Examples I and II of this invention. The spalling test (ASTM C122–52), with an air blast substituted for the usual air-water mixed blast, shows the definite superiority of Examples I and II according to this invention as compared with Example III in which the SAF limits of this invention were exceeded. It may be noted that Example III represents the best prior burned stabilized lime refractory known to us, and that although its density and strength after burning were comparable to Examples I and II, the brick of Example III showed about twice as much shrinkage in burning.

Brick in accordance with this invention as just described are suited for use in open hearth furnaces, hot blast cupolas, electric furnaces, metal ladles, hot metal mixers, and the like.

For the lining of converters in the oxygen steel-making process the presence of residual carbon in our refractories is essential to obtain the best performance while observing the composition limits specified above for the present invention.

In the development of refractories for the oxygen converter process of making steel, the brick manufacturer is greatly handicapped by the costliness of the loss of steel production when an experimental refractory fails prematurely. We have, however, succeeded in developing a test that gives a good measure of the performance of refractories in the oxygen converter. In a typical oxygen steel-making process, the slag has a relatively low $$CaO:SiO_2$$

ratio in the early period of the blow, while the ratio of CaO increases progressively toward the end. This may be exemplified by the following tabulation:

CHEMICAL ANALYSIS OF STEEL-MAKING SLAGS AT VARIOUS INTERVALS THROUGH A NORMAL HEAT OR BLOW

| Time From Start of Blow | $SiO_2$ | Iron Oxide as $Fe_2O_3$ | CaO | MgO | MnO | $CaO/SiO_2$ Ratio |
|---|---|---|---|---|---|---|
| 6 minutes | 31.9 | 11.6 | 40.3 | 4.3 | 5.8 | 1.2 |
| 12 minutes | 29.2 | 13.5 | 41.6 | 3.1 | 6.1 | 1.3 |
| 18 minutes | 17.8 | 9.0 | 56.6 | 6.5 | 3.6 | 3.0 |
| 22 minutes (Final Slag.) | 17.8 | 21.8 | 45.0 | 5.9 | 4.1 | 2.3 |

Thus, in the early period silica in the relatively acid slag is the dominantly corrosive oxide, and such slags of low $CaO:SiO_2$ ratio are extremely fluid and corrosive. When the low lime early slag reacts with the lime charged to the vessel, it eventually becomes satisfied with lime and, consequently, is less corrosive to the refractories. We now believe that there is a surprising and unexpected advantage in having the refractory, itself, contribute in part to the satisfaction of the slag, and that this is accomplished by our new refractories with at least 5 percent of CaO.

However, we have found that when more than about 50 percent, by weight, of CaO is present in the refractory body, its resistance to the high iron oxide final slag is severely reduced. Therefore, although at least 5 percent CaO is required to furnish good resistance to the extremely corrosive early slag, the amount of CaO should not exceed about 50 percent, by weight, in order to provide a brick which will also exhibit good resistance to attack by the late slag.

The slag test that we have developed makes use of brick with residual carbon of the compositions to be tested. A slag pocket is drilled into them, and a compressed cylinder of synthetic slag, of the following composition, weighing 0.12 lb. is pressed within the cup which is then heated to 2910° F. in about 3 hours and then held at that temperature for 5 hours. The cooled bricks are then sawed in two through the slag cup for observation and study of the degree to which corrosion and penetration of the brick by the slag have occurred. During the test, the bricks are covered with slabs of other refractories to protect them from oxidation of their carbon contents.

ANALYSIS OF SLAG

| | Percent |
|---|---|
| Lime (CaO) | 42.0 |
| Silica ($SiO_2$) | 33.0 |
| Iron oxide ($Fe_2O_3$) | 12.4 |
| Magnesia (MgO) | 4.3 |
| Manganese oxide (MnO) | 5.8 |
| Phosphorus oxide ($P_2O_5$) | 0.8 |
| Alumina ($Al_2O_3$) | 0.3 |
| Titania ($TiO_2$) | 1.4 |

Applying this slag test, we have found that whereas the industry has tended to view pure magnesia as the ultimate basic refractory, bricks made of 100 percent of a high purity dead burned magnesite resisted the slag so poorly in this test that none was held in the slag cup, all of it having been absorbed and necessarily altering the refractory in an undesired way. In contrast, bricks made in accordance with this invention containing at least 96 percent of lime-plus-magnesia with at least 5 percent of lime, and a maximum of 4 percent of SAF, perform outstandingly in containing the slag within the cup in this test. In the latter case, the cups were corroded to a minor degree; but their lime content contributed to satisfaction of the lime hunger of the slag, and reaction was little more than a surface effect.

This slag test has been highly successful as guidance for the use of our new refractories in commercial oxygen steel-making vessels. The following table gives the analysis of various lime-magnesia refractory compositions that have been used in steel-making vessels together with their behavior in service, that was observed by us and on which we received full performance results. All of these contained residual carbon.

STEEL-MAKING REFRACTORIES

| | MgO | CaO | $SiO_2$ | $Al_2O_3$ | $Fe_2O_3$ | SAF [1] | Heats |
|---|---|---|---|---|---|---|---|
| 1. 100% Mag E | 88.7 | 3.3 | 0.6 | 0.6 | 6.5 | 7.7 | 120 |
| 2. 100% Dol A | 53.0 | 38.9 | 1.2 | 0.8 | 3.7 | 5.5 | 160 |
| 3. 60% Dol A, 40% Mag C | 57.7 | 33.8 | 2.7 | 1.2 | 3.8 | 7.7 | 200 |
| 4. 60% Dol A, 40% Mag D | 61.3 | 32.4 | 2.3 | 0.9 | 3.2 | 6.4 | 200 |
| 5. 70% Dol A, 30% Mag D | 55.6 | 37.5 | 1.7 | 0.6 | 3.7 | 6.0 | 200 |
| 6. 60% Dol B, 40% Mag D | 63.0 | 35.4 | 1.2 | 0.2 | 0.4 | 1.8 | 300 |
| 7. 70% Dol B, 30% Mag F | 57.1 | 40.8 | 0.5 | 0.2 | 0.3 | 1.0 | 279 |
| 8. 50% Dol B, 50% Mag F | 69.0 | 29.5 | 0.9 | 0.2 | 0.4 | 1.5 | 285 |
| 9. 30% Dol B, 70% Mag F | 79.8 | 18.2 | 1.1 | 0.2 | 0.5 | 1.8 | 272 |
| 10. 10% Lime G, 90% Mag F | 86.6 | 10.8 | 1.6 | 0.3 | 0.6 | 2.5 | 268 |

[1] Total of $SiO_2$, $Al_2O_3$, and $Fe_2O_3$.
Mag=Magnesite; Dol=Dolomite.

The raw materials used in preparing the refractories of the foregoing table were of the following composition:

RAW MATERIALS

| | A | B | C | D | E | F | G |
|---|---|---|---|---|---|---|---|
| | Dead Burned Commercial Dolomite | Dead Burned Pure Dolomite | Dead Burned Magnesite | Dead Burned Magnesite | Dead Burned Magnesite | Dead Burned Magnesite | Calcined Lime |
| MgO | 38.9 | 41.8 | 85.9 | 94.8 | 88.7 | 96.1 | 0.9 |
| CaO | 53.0 | 57.7 | 5.1 | 1.5 | 3.3 | 1.4 | 96.3 |
| SiO$_2$ | 1.2 | 0.1 | 4.3 | 2.8 | 0.6 | 1.6 | 1.6 |
| Al$_2$O$_3$ | 0.8 | 0.1 | 0.8 | 0.3 | 0.6 | 0.3 | 0.3 |
| Fe$_2$O$_3$ | 5.1 | 0.2 | 4.1 | 0.6 | 6.5 | 0.6 | 0.8 |
| SAF | 7.1 | 0.4 | 9.2 | 3.7 | 7.7 | 2.5 | 2.7 |

As will be observed, the foregoing data well illustrate the significance of the present invention. For example, all of the compositions containing 5.5 or more percent of SAF exhibited service life of less than 200 heats and even as low as 120 heats. In sharp contrast, the refractory according to this invention, No. 6, with but 1.8 percent of SAF and with lime and magnesia within the limits of this invention, actually set the shop record of 300 heats in the steel plant where this product was tested. This represented a life of more than 50 percent greater than any of the other refractories of the table, and the significance of this to the steel producer needs no elaboration. It may be added that, in the case of composition 6 of our invention, not even a minor patch was required until 200 heats, whereas prior refractories typically require repair after about 100 heats. Refractories 3, 4 and 5, it may be added, have been used commercially with results in the range stated. Refractories No. 7 to 10 are also within the scope of the invention, and show the sharp increase in heats that can be achieved therewith. Refractory No. 6 is that produced in Example I, while No. 10 is that produced in Example II.

Although, of course, it must be admitted that service life in only an empirical measure of the quality of a refractory brick, the exceptional number of heats obtained with compositions 6 through 10 would seem conclusive in demonstrating the marked improvement possessed by refractories made in accordance with our invention. Of particular note are the comparisons of compositions 5 and 7 and 4 and 6, wherein the extended service life is directly reflected in the lowering of the percentage of SAF.

While 5 to 50% CaO, in shapes and batches according to this invention, provides very satisfactory service in the basic oxygen furnace, we have discovered the preferred range to be 5 to 10% with optimum results obtained when the CaO is maintained between 6.5 and 7%, by weight, of the total batch. Such a batch, on the basis of an oxide analysis, would analyze about 6.5 to 7% CaO, less than about 3%, by weight, SAF, preferably less than 2% SAF, and the percentage of lime not combined with silica (available lime) to be about 3.5 to 4.5%, the remainder being MgO. This batch may be made from hydration-resistant coburned grain of the type manufactured according to the invention of application 40,181, mentioned above; or it may be made by adding very finely divided lime hydrate (all —150 mesh, preferably of 99% purity) to dead burned magnesite grain, so size graded as to attain the desired overall batch sizing.

We have found the 6.5% CaO-containing grain, as manufactured according to the techniques of said application 40,181, to be microscopically characterized by coarse textured periclase particles or crystallites and dispersed discontinuous pockets of tricalcium silicate. Available lime is randomly distributed through the periclase particles.

Using the coburned grain (having the optimum 6.5% CaO content) to make tar bonded brick in the manner discussed elsewhere herein, we were able to obtain a density of over 190 pounds per cubic foot. This is the highest density we have been able to obtain in the laboratory with this type of material. In a slag test, in which 900 grams of molten basic oxygen furnace early slag was dripped on a shape made of the 6.5% CaO-containing coburned grain, over a period of about twelve hours, there was less corrosion and penetration by the slag than of any of the other mixes we have tested.

This same grain is also very satisfactory, when used in batches to make ceramically bonded shapes suitable for subsequent tar impregnation.

The refractories of this invention may be used in unburned, or baked, as well as in the burned condition, and also for the construction of monolithic structures. Our invention relates to the composition of the finished refractories, as indicated above, rather than to the method of manufacture, which follows practices well established in the refractory field. The raw materials will normally be dead burned or sintered lime, dolomite and synthetic magnesite converter to hydration resistant condition without additives, as by the procedures of the applications identified above. These may be combined in any way provided the final product meets the composition limits that characterize and are critical to this invention. The refractory may be made of a single raw material or of a blend as long as the critical requirements of composition and of good brickmaking practice are met. Commercial sintered dolomites generally fail to meet our analysis requirements because they contain an excess of iron oxide, alumina or silica, any or all. Consequently, in the practice of our invention it is necessary to use high purity raw materials. Likewise, they must be rendered hydration resistant without the use of additives which impair refractoriness to a damaging degree, for instance in the case of lime and magnesia by the practice of Serial No. 7,767, or in the case of lime by the practice of Serial No. 808,014, both described above. Where dolomite is not used, the required analysis may be provided by a blend of several lime and magnesia materials in dead burned condition, or a more or less homogeneous blend may be produced before dead burning.

The exact grind to be used will be understood by those familiar with the refractory art. An example suited for many purposes is a grind of —4+10 mesh 21 percent —10+28 mesh 27 percent, —28+65 mesh 12 percent, and —65 mesh 40 percent.

Mixing is accomplished in standard brick batch mixing equipment, such as a solid bottom pan with mullers revolving on a horizontal axis. For steel converter linings, it is preferred to use brick in the unburned condition, and for such purposes the batch is mixed with tar or pitch, 4 to 8 percent, by weight, being generally suitable. In such case, it is helpful to preheat the batch to at least about 200° F. so that tar or pitch is fluid enough to assure intimate intermixing of all of the ingredients. In the case of burned bricks, it is preferred to add paraffin to the batch, likewise heated, and to effect tar addition at a later step. Tars are commonly classified as petroleum tars and coal tars. Petroleum tars are spoken of as asphalts and coal tars as tars. Therefore, the term tar is considered to include asphalts as well as coal tars.

The brick are formed by any of the compacting or shaping methods used in refractory practices, such as pressing, machine impacting, or air ramming. Following the forming step, the brick may be burned or baked, as the case may be, to prepare them for use. If thye are baked, this will ordinarily be performed at about 600° to 1500° F., while burning will ordinarily be accomplished in the range 2400° to 3100° F.

If the brick are intended for burning, it is not necessary to use tar in mixing the batch. Other temporary bonds such as waxes may be preferred. Many choices are possible but, in any case, the firing process decomposes or volatilizes the temporary binder so as to open up pores and channels that permit impregnation with tar after firing, if the intended use makes residual carbon desirable.

A carbon residue in the brick is essential for oxygen vessel service, and this is contributed by the tar which is carbonized in service. The tar or pitch may be added to the batch as indicated above in the case of unburned or baked shapes, or in the case of burned shapes impregnation with molten tar or pitch may be accomplished by the well known pressure or vacuum-pressure methods, such as those applied to the preservation of railroad ties. Alternatively, the brick, whether burned or unburned, may be impregnated by immersing them for a period in molten hot or boiling tar although ordinarily this is less effective.

In summation, it will be apparent from the preceding discussion and examples that these high density lime-magnesia grains with a minimum lime plus magnesia content of 97 percent are especially well suited for making superior quality refractory brick of various types. The test data indicate a clear superiority of these brick in all important refractory considerations. These superior properties are attained because the natural hydration resistance of these grain makes it unnecessary to add the so called "stabilizing" agents previously felt to be required in amounts of which produced a product with impaired refractoriness and, therefore, distinctly limited use.

According to the provisions of the patent statutes, we have explained the principle of our invention and have described what we now consider to represent its best embodiment. However, we desire to have it understood that, within the scope of the appended claims, the invention may be practiced otherwise than as specifically described.

This application is a continuation-in-part of application Serial No. 38,438, filed June 24, 1960, entitled "High Temperature Refractory," and owned by the same assignee as the instant invention, and now abandoned.

We claim:

1. A batch for making refractories exposed to very high temperatures consisting essentially of, by weight, at least 96 percent MgO and CaO, on the basis of an oxide analysis, the MgO ranging from about 95 to 50 percent, the CaO ranging from about 5 to 50 percent, said MgO and CaO being in the form of hydration-resistant, coburned refractory grain, CaO being uniformly distributed through the batch, and refractories made therefrom, as available lime in a form capable of contributing to the satisfaction of the lime hunger of high temperature oxygen converter slags by reaction therewith substantially without slag penetration, the remainder of the batch consisting essentially of $SiO_2$, $Al_2O_3$ and $Fe_2O_3$ on the basis of an oxide analysis, and about 4 to 8 percent based on the foregoing composition, of material of the group consisting of tar and pitch.

2. The batch of claim 1, in which the $SiO_2$, $Al_2O_3$ and $Fe_2O_3$ is less than about 3 percent, by weight.

3. An unburned refractory brick consisting essentially of, by weight, at least 96 percent MgO and CaO, on the basis of an oxide analysis, the MgO ranging from about 95 to 50 percent, the CaO ranging from about 5 to 50 percent, said MgO and CaO being in the form of a hydration-resistant, coburned refractory grain, CaO being uniformly distributed through the brick as available lime in a form capable of contributing to the satisfaction of the lime hunger of high temperature oxygen converter slags by reaction therewith substantially without slag penetration, the remainder of the brick consisting essentially of $SiO_2$, $Al_2O_3$ and $Fe_2O_3$ on the basis of an oxide analysis, said brick being impregnated with material of the group consisting of tar and pitch.

4. The brick of claim 3, in which the tar and pitch comprises about 4 to 8 percent, by weight, based on the composition of the brick.

5. The method of making a refractory shape adapted for use in contact with basic oxygen converter slags at very high temperatures comprising the steps of, forming a brickmaking batch, said batch consisting essentially of, by weight, at least 96 percent MgO and CaO, on the basis of an oxide analysis, the MgO ranging from about 95 to 50 percent, the CaO ranging from about 5 to 50 percent, said MgO and CaO being in the form of a hydration-resistant, coburned refractory grain, CaO being uniformly distributed through the batch and refractory shapes made therefrom as available lime in a form capable of contributing to the satisfaction of the lime hunger of high temperature oxygen converter slags by reaction therewith substantially without slag penetration, the remainder of the batch consisting essentially of $SiO_2$, $Al_2O_3$ and $Fe_2O_3$ on the basis of an oxide analysis, mixing the resulting batch with about 4 to 8 percent, by weight, based on the composition of the batch, of carbonaceous material selected from the group consisting of tar and pitch, forming the resulting mixture into shapes, and baking the shapes.

6. The method of making a refractory shape adapted for use in contact with basic oxygen converter slags at very high temperatures comprising the steps of, forming a brickmaking batch, said batch consisting essentially of, by weight, at least 96 percent MgO and CaO, on the basis of an oxide analysis, the MgO ranging from about 95 to 50 percent, the CaO ranging from about 5 to 50 percent, said MgO and CaO being in the form of a hydration-resistant, coburned refractory grain, CaO being uniformly distributed through the batch and refractory shapes made therefrom as available lime in a form capable of contributing to the satisfaction of the lime hunger of high temperature oxygen converter slags by reaction therewith substantially without slag penetration, the remainder of the batch consisting essentially of $SiO_2$, $Al_2O_3$ and $Fe_2O_3$ on the basis of an oxide analysis, forming the resulting mixture into shapes, and impregnating the resulting formed shape to obtain about 4 to 8 percent, by weight, of carbonaceous material selected from the group consisting of tar and pitch in the formed shape.

7. The method of making a fired refractory shape adapted for use in contact with basic oxygen converter slags at very high temperatures comprising the steps of, forming a brickmaking batch, said batch consisting essentially of, by weight, at least 96 percent MgO plus CaO, on the basis of an oxide analysis, the MgO ranging from about 95 to 50 percent, the CaO ranging from about 5 to 50 percent, said MgO and CaO being in the form of a hydration-resistant, coburned refractory grain, CaO being uniformly distributed through the batch and fired shapes made therefrom as available lime in a form capable of contributing to the satisfaction of the lime hunger of high temperature oxygen converter slags by reaction therewith substantially without slag penetration, the remainder of the batch consisting essentially of $SiO_2$, $Al_2O_3$ and $Fe_2O_3$ on the basis of an oxide analysis, forming the batch into shapes, firing the resulting formed shapes, and impregnating the resulting fired shapes to obtain about 4 to 8 percent, by weight, of carbonaceous material selected from the group consisting of tar and pitch in the fired shapes.

8. A batch for making refractories exposed to very high temperature basic oxygen converter slags, consisting essentially of, by weight, at least 96 percent MgO and CaO, on the basis of an oxide analysis, and made from a homogeneous blend of high purity dolomite and magnesia, the MgO content of the blend ranging from about 95 to 50 percent, the CaO ranging from about 5 to 50 percent, said dolomite and magnesia both being in a dead burned condition, CaO being uniformly distributed through at least the fine fraction of the batch and refractories made therefrom as available lime in a form capable of contributing to the lime hunger of high temperature oxygen converter slags by reaction therewith substantially without slag penetration, the remainder of the batch consisting essentially of $SiO_2$, $Al_2O_3$ and $Fe_2O_3$ on the basis of an oxide analysis, and about 4 to 8 percent, by weight, based on the foregoing composition, of material selected from the group consisting of tar and pitch.

9. A batch for making refractories exposed to basic oxygen converter slags at very high temperatures, and particularly suited to resist penetration by the slag formed in oxygen steelmaking processes, consisting essentially of, by weight, at least 96 percent MgO and CaO, on the basis of an oxide analysis, and made from a blend of materials selected from the group consisting of dead burned, high purity dolomite, magnesia and lime, the MgO content of the blend ranging from about 95 to 50 percent, the CaO ranging from about 5 to 50 percent, the CaO being uniformly distributed through at least the fine fraction of the batch and refractories made therefrom as available lime in a form capable of contributing to the satisfaction of the lime hunger of high temperature oxygen converter slags by reaction therewith substantially without slag penetration, the remainder of the batch consisting essentially of $SiO_2$, $Al_2O_3$ and $Fe_2O_3$ on the basis of an oxide analysis, and about 4 to 8 percent, by weight, based on the foregoing composition, of material of the group consisting of tar and pitch.

10. A batch for making refractories to be exposed to very high temperatures, consisting essentially of, by weight, at least 96 percent MgO and CaO, on the basis of an oxide analysis, the MgO ranging from about 95 to 90 percent, the CaO ranging from about 5 to 10 percent, said MgO and CaO being in the form of hydration-resistant, coburned refractory grain, CaO being uniformly distributed through the batch, and refractories made therefrom, as available lime in a form capable of contributing to the satisfaction of the lime hunger of high temperature oxygen converter slags by reaction therewith substantially without slag penetration, the remainder of the batch consisting essentially of $SiO_2$, $Al_2O_3$ and $Fe_2O_3$ on the basis of an oxide analysis, and about 4 to 8 percent based on the foregoing composition, of material of the group consisting of tar and pitch.

11. A batch for making refractories to be exposed to very high temperature basic oxygen converter slags, consisting essentially of, by weight, at least 96 percent MgO and CaO, on the basis of an oxide analysis, and made from a homogeneous blend of high purity dolomite and magnesia, the MgO content of the blend ranging from about 95 to 90 percent, the CaO ranging from about 5 to 10 percent, said dolomite and magnesia both being in a dead burned condition, CaO being uniformly distributed through at least the fine fraction of the batch and refractories made therefrom as available lime in a form capable of contributing to the lime hunger of high temperature oxygen converter slags by reaction therewith substantially without slag penetration, the remainder of the batch consisting essentially of $SiO_2$, $Al_2O_3$ and $Fe_2O_3$ on the basis of an oxide analysis, and about 4 to 8 percent, by weight, based on the foregoing composition, of material selected from the group consisting of tar and pitch.

12. A batch for making refractories to be exposed to basic oxygen converter slags at very high temperatures, and particularly suited to resist penetration by the slag formed in oxygen steel-making processes, consisting essentially of, by weight, at least 96 percent MgO and CaO, on the basis of an oxide analysis, and made from a blend of materials selected from the group consisting of dead burned, high purity dolomite, magnesia and lime, the MgO content of the blend ranging from about 95 to 90 percent, the CaO ranging from about 5 to 10 percent, CaO being uniformly distributed through at least the fine fraction of the batch and refractories made therefrom as available lime in a form capable of contributing to the satisfaction of the lime hunger of high temperature oxygen converter slags by reaction therewith substantially without slag penetration, the remainder of the batch consisting essentially of $SiO_2$, $Al_2O_3$ and $Fe_2O_3$ on the basis of an oxide analysis, and about 4 to 8 percent, by weight, based on the foregoing composition, of material of the group consisting of tar and pitch.

13. The method of making a refractory shape capable of use in contact with basic oxygen converter slags at very high temperatures comprising the steps of, forming a brickmaking batch, said batch consisting essentially of, by weight, at least 96 percent MgO and CaO, on the basis of an oxide analysis, the MgO ranging from about 95 to 90 percent, the CaO ranging from about 5 to 10 percent, said MgO and CaO being in the form of a hydration-resistant coburned refractory grain, CaO being uniformly distributed through the batch and refractory shapes made therefrom as available lime in a form capable of contributing to the satisfaction of the lime hunger of high temperature oxygen converter slags by reaction therewith substantially without slag penetration, the remainder of the batch consisting essentially of $SiO_2$, $Al_2O_3$ and $Fe_2O_3$ on the basis of an oxide analysis, mixing the resulting batch with about 4 to 8 percent, by weight, based on the composition of the batch, of carbonaceous material selected from the group consisting of tar and pitch, and forming the resulting mixture into shapes.

14. The method of making a refractory shape capable of use in contact with basic oxygen converter slags at very high temperatures comprising the steps of, forming a brickmaking batch, said batch consisting essentially of, by weight, at least 96 percent MgO and CaO, on the basis of an oxide analysis, the MgO ranging from about 95 to 90 percent, the CaO ranging from about 5 to 10 percent, said MgO and CaO being in the form of a hydration-resistant, coburned refractory grain, CaO being uniformly distributed through the batch and refractory shapes made therefrom as available lime in a form capable of contributing to the satisfaction of the lime hunger of high temperature oxygen converter slags by reaction therewith substantially without slag penetration, the remainder of the batch consisting essentially of $SiO_2$, $Al_2O_3$ and $Fe_2O_3$ on the basis of an oxide analysis, mixing the resulting batch with about 4 to 8 percent, by weight, based on the composition of the batch, of carbonaceous material selected from the group consisting of tar and pitch, forming the resulting mixture into shapes, and baking the shapes.

15. The method of making a refractory shape adapted for use in contact with basic oxygen converter slags at very high temperatures comprising the steps of, forming a brickmaking batch, said batch consisting essentially of, by weight, at least 96 percent MgO and CaO, on the basis of an oxide analysis, the MgO ranging from about 95 to 90 percent, the CaO ranging from about 5 to 10 percent, said MgO and CaO being in the form of a hydration-resistant, coburned refractory grain, CaO being uniformly distributed through the batch and refractory shapes made therefrom as available lime in a form capable of contributing to the satisfaction of the lime hunger of high temperature oxygen converter slags by reaction therewith substantially without slag penetration, the remainder of the batch consisting essentially of $SiO_2$, $Al_2O_3$ and $Fe_2O_3$ on the basis of an oxide analysis, forming the resulting mixture into shapes, and impregnating the resulting formed shape to obtain about 4 to 8 percent, by weight, of carbonaceous material selected from the group consisting of tar and pitch in a formed shape.

16. The method of making a fired refractory shape capable of use in contact with basic oxygen converter slags at very high temperatures comprising the steps of, forming a brickmaking batch, said batch consisting essentially of, by weight, at least 96 percent MgO plus CaO, on the basis of an oxide analysis, the MgO ranging from about 95 to 90 per cent, the CaO ranging from about 5 to 10. percent, said MgO and CaO being in the form of a hydration-resistant, coburned refractory grain, CaO being uniformly distributed through the batch and fired shapes made therefrom as available lime in a form capable of contributing to the satisfaction of the lime hunger of high temeprature oxygen converter slags by reaction therewith substantially without slag penetration, the remainder of the batch consisting essentially of $SiO_2$, $Al_2O_3$ and $Fe_2O_3$ on the basis of an oxide analysis, forming the batch into shapes, firing the resulting formed shapes, and impregnating the resulting fired shapes to obtain about 4 to 8 percent, by weight, of carbonaceous material selected from the group consisting of tar and pitch in the fired shapes.

17. A batch for making refractories to be exposed to very high temperature and corrosive basic slags, consisting essentially of, by weight, at least 96 percent MgO and CaO, on the basis of an oxide analysis, and made from a homogeneous blend of material of the group dead burned magnesia, dead burned dolomite and high purity lime hydrate, the MgO content of the blend ranging from 95 to 90 percent, between 5 and 10 percent CaO, by weight and on the basis of an oxide analysis, the CaO being uniformly distributed at least through the fine fraction of the batch and refractories made therefrom as available lime in a form capable of contributing to the satisfaction of the lime hunger of high temperature oxygen converter slags by reaction therewith substantially without slag penetration, the remainder of the batch consisting essentially of $SiO_2$, $Al_2O_3$ and $Fe_2O_3$, on the basis of an oxide analysis.

18. A fired basic refractory shape made from a batch consisting essentially of, by weight, at least 96 percent MgO and CaO, on the basis of an oxide analysis, and made from a homogeneous blend of dead burned magnesia and lime hydrate, the lime hydrate all being in the fine fraction of the batch, the MgO content of the blend ranging from 95 to 90%, there being sufficient lime hydrate to supply the batch with between 5 and 10 percent CaO, by weight and on the basis of an oxide analysis, the CaO being uniformly distributed through the fine fraction of the batch as available lime in a form capable of contributing to the satisfaction of the lime hunger of high temperature oxygen converter slags by reaction therewith substantially without slag penetration, the remainder of the batch consisting essentially of $SiO_2$, $Al_2O_3$ and $Fe_2O_3$, on the basis of an oxide analysis, said fired shape microscopically characterized by periclase particles, spaced, disconnected pockets of tricalcium silicate, and available lime distributed through the matrix.

19. The method of making a refractory shape adapted for use in contact with basic oxygen converter slags at very high temperatures comprising the steps of, forming a brickmaking batch, said batch consisting essentially of, by weight, at least 96 percent MgO and CaO, on the basis of an oxide analysis, the MgO ranging from about 95 to 50 percent, the CaO ranging from about 5 to 50 percent, said MgO and CaO being in the form of a hydration-resistant coburned refractory grain, CaO being uniformly distributed through the batch and refractory shapes made therefrom as available lime in a form capable of contributing to the satisfaction of the lime hunger of high temperature oxygen converter slags by reaction therewith substantially without slag penetration, the remainder of the batch consisting essentially of $SiO_2$, $Al_2O_3$ and $Fe_2O_3$ on the basis of an oxide analysis, mixing the resulting batch with about 4 to 8 percent, by weight, based on the composition of the batch, of carbonaceous material selected from the group consisting of tar and pitch, forming the resulting mixture into shapes.

20. The method of making a fired refractory shape to be exposed to very high temperatures comprising the steps of, forming a brickmaking batch, said batch consisting essentially of, by weight, at least 96% MgO and CaO, on the basis of an oxide analysis, and made from a blend of materials selected from the group consisting of dead burned, high purity dolomite, magnesia and lime, the MgO content of the blend ranging from about 95 to 50%, the CaO ranging from about 5 to 50%, CaO being uniformly distributed through at least the fine fraction of the batch and refractories made therefrom as available lime in a form capable of contributing to the satisfaction of the lime hunger of high temperature oxygen converter slags by reaction therewith substantially without slag penetration, the remainder of the batch consisting essentially of $SiO_2$, $Al_2O_3$ and $Fe_2O_3$ on the basis of an oxide analysis, forming the batch into shapes and firing the resulting formed shapes.

References Cited in the file of this patent
UNITED STATES PATENTS

| | | |
|---|---|---|
| 2,943,240 | Martinet | June 28, 1960 |
| 2,952,605 | De Varda | Sept. 13, 1960 |